Sept. 21, 1971  A. L. JOHNSON  3,606,825
PROCESS OF MELTING GLASS
Filed Dec. 24, 1969
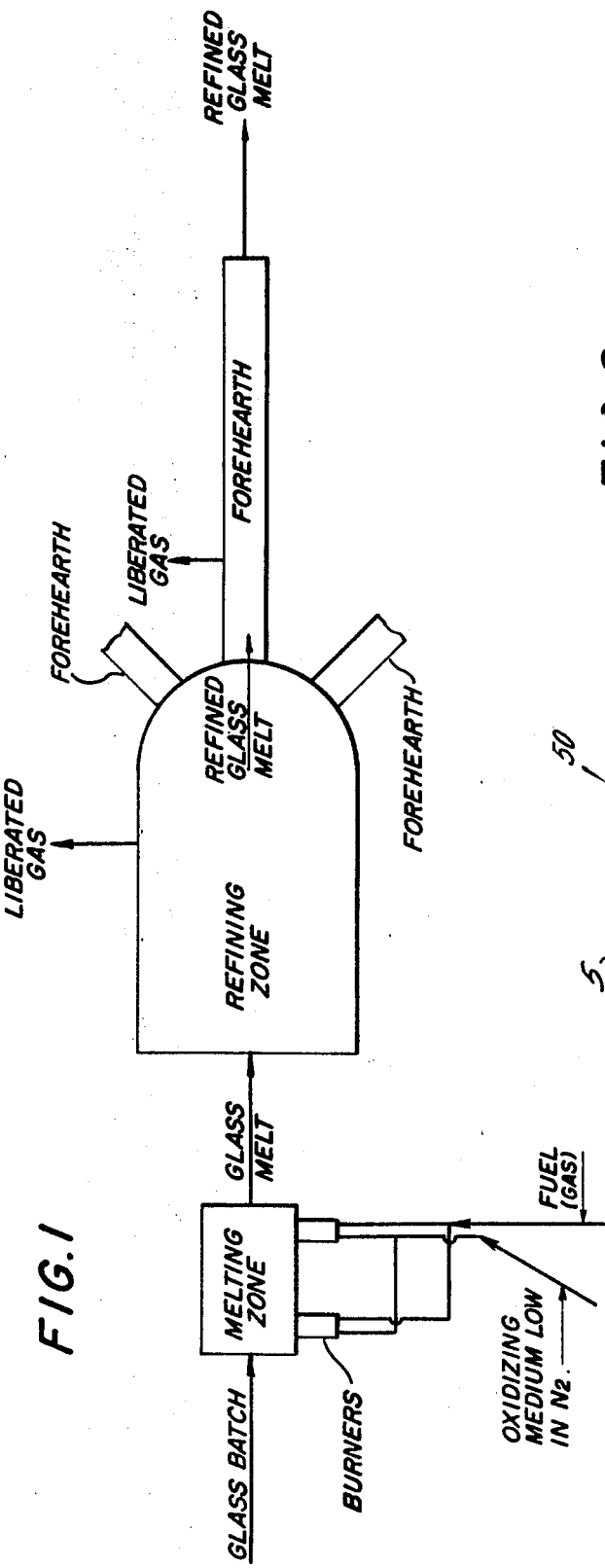
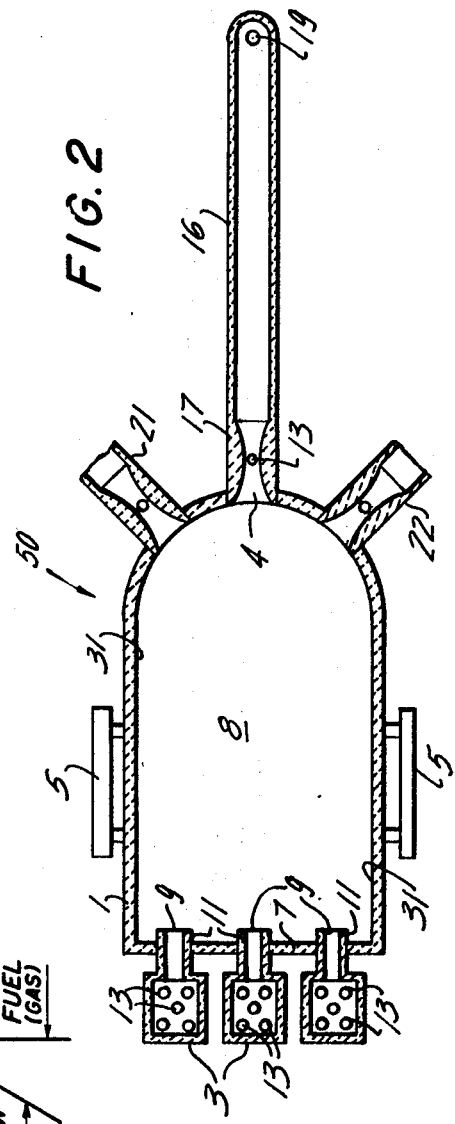

United States Patent Office 3,606,825
Patented Sept. 21, 1971

3,606,825
PROCESS OF MELTING GLASS
Andrew L. Johnson, New Castle, Pa., assignor to Glass Container Industry Research Corporation, New Castle, Pa.
Filed Dec. 24, 1969, Ser. No. 887,897
Int. Cl. C03b 5/16, 5/18
U.S. Cl. 65—136                                5 Claims

ABSTRACT OF THE DISCLOSURE

Melting of glass batch wherein the products of combustion of a gaseous fuel are introduced into the molten glass bath at a submerged level therein, with the gaseous fuel being combusted in an oxidizing medium low in nitrogen.

BACKGROUND OF THE INVENTION

In the melting of glass batch the particulate batch ingredients are fused into a melt, and the melt is then refined to eliminate any bubbles or gaseous occlusions trapped within the melt as an incident of the melting process. Commonly, the glass batch is melted in the melting chamber of a glass furnace with the melting chamber having gas fuel-fired burner units which are generally arranged such that the products of combustion issue from the burner units above the body of glass in the furnace and sweep across its surface thereby radiantly and conductively to heat the batch from the top side. The glass batch being rendered molten flows from the melting chamber to a refining zone part of the glass furnace where it is refined to free the glass of undesirable seeds and bubbles, the latter comprising occluded gases, principally nitrogen, which do not rise to the surface of the molten glass while it is in the melting chamber. Following refining, the molten glass can be conditioned further or drawn off for use.

It is known in the art to utilize submerged burner equipment in a glass furnace for melting glass batch. This involves the introduction of the hot products of combustion issuing from the burner equipment directly into the batch below the melt surface thereby to increase melting efficiency and reduce furnace size, particularly with respect to reducing the size of the furnace melting chamber. Representative of such prior art teaching and equipment are the Dolf et al. U.S. Pat. Nos. 3,248,205 and 3,260,587.

In submerged burner type furnace equipment and attendant melting techniques, such as described in U.S. Pat. No. 3,260,587, the melting chamber is generally fired with a bank of burner units located at the bottom of the furnace with the burner units being supplied with a gaseous fuel-air mixture which is combusted in the burner unit combustion chamber to produce the hot products of combustion. The hot products of combustion discharge directly from the burner unit into the glass batch, at a submerged level and travel upwardly through the batch ingredients heating them to a molten state. This mode of firing the glass batch with attendant passage of the hot products of combustion through the batch, while it promotes uniformity and efficiency of melting, has the undesirable drawback of saturating the melt with gas bubbles, the smaller of which are often referred to as "seeds" and in the main which exist by reason of undesirable levels of nitrogen being present in the products of combustion. Thus it is characteristic of the use of submerged burner equipment that it produces an excessively large and undesirable residuum of seeds in the melt.

The presence of excessive levels of seeds in the molten glass in consequence of using submerged burner equipment demands more fining of the glass and frequently at temperature levels above those ordinarily involved in fining glass than is encountered when the glass furnace is fired at or above the surface of the glass body. The fining operation involves holding the glass melt for a period of time at elevated temperature in the glass furnace refining zone. Prolonging such operation precludes effecting achievement of improved production rates and efficiency of conventional glass melting processes generally, and more specifically in submerged burner melting techniques.

SUMMARY OF THE INVENTION

The present invention relates to a process for making glass wherein the heat for melting the batch ingredients is supplied to the glass furnace melting chamber by introducing highly heated products of combustion of a gaseous fuel into the glass at a submerged level therein, with the gaseous fuel being combusted in an oxidizing medium having a nitrogen content below the nitrogen content of the air more preferably substantially below the nitrogen content of air but most preferably substantially devoid of nitrogen.

In melting glass in accordance with the present invention, significant and unexpected reduction in the time and temperature required for fining the glass is possible. The reduction in fining time is due in part to the fact that the volume of combustion products introduced into the glass when employing an oxidizing medium according to the present invention constitutes only about ⅕ the volume introduced therein when using air as the oxidizing medium, and thus a correspondingly smaller volume of products of combustion residuum only need be refined out. Moreover, since the present invention makes possible the use of lower glass making temperatures, particularly in the forehearth, longer furnace refractory life, lower manufacturing costs, etc., are to be expected.

In addition, in accordance with the present invention, the heat generated by combustion is carried by products of combustion whose volume is only about ⅕ that of the volume of the combustion products obtained when air is used as the oxidizing medium wherein the nitrogen is inert and does not participate in the combustion reaction. This smaller volume of products of combustion therefore is heated to a higher temperature making the overall melting process a more efficient one. Moreover, using an oxidizing medium other than air reduces the tendency toward foaming or creation of seeds, increases the rate of dissipation of seeds, and provides a higher burner flame temperature by about 1,000° F., which substantially increases the rate of melting. This results in more efficient and rapid heating of glass thereby increasing furnace output.

DESCRIPTION OF THE PREFERRED EMBODIMENTS

For further understanding of the invention, reference should be made to the following detailed description taken in conjunction with the accompanying drawing in which:

FIG. 1 is a flow diagram associated with the production of glass according to the present invention.

FIG. 2 is a schematic view, in horizontal section, of a glass furnace including a forehearth section in which glass can be treated in accordance with the principles of the present invention.

The present invention is concerned with melting glass batch in such manner as to minimize if not nearly completely eliminate the formation of "seeds" during the batch melting when using submerged burner unit equipment in the glass furnace melting chamber. "Seeds" will be understood as meaning occluded or entrapped gas bubbles, principally inert gases and more specifically nitrogen evolved in the combustion process. Other fines of course become entrapped in the melt as a result of the passage of the products of combustion upwardly through the melt, but these other fines including water vapor, carbon dioxide, carbon monoxide, sulphur dioxide, nitric oxide and batch volatiles readily escape the melt. Nitrogen on the other hand is difficult to remove and it is its presence which necessarily accounts for the need for a fining operation.

According to the present invention the presence of "seeds" in the molten glass batch is greatly reduced or eliminated when firing a glass furnace melting chamber with submerged burner unit equipment by combusting the fuel supplied to the burner unit equipment in an oxidizing medium having a nitrogen content below the nitrogen content of air, more preferably substantially below the nitrogen content of air but most preferably one which is substantially devoid of nitrogen. In this manner the products of combustion introduced into the glass batch will have little if any nitrogen therein. The preferred oxidizing medium is pure oxygen although oxygen-air mixtures can be used if the amount of nitrogen in the air produces in the products of combustion a level of "seeds" in the melt considered acceptable from the standpoint of ease with which the glass can be fined and ultimate effect on the glass itself. It will be understood of course that commercial oxygen is not wholly free of nitrogen and in most instances will include traces of nitrogen and other inert gases, notably argon, in percentages up to 0.5%. However such quantity of nitrogen has no essential or practical effect on the objects or working of the present invention. As was indicated above, certain levels of the presence of nitrogen in the products of combustion can be tolerated. In fact, the total absence of nitrogen from the products of combustion is not to be expected. For example, a preferred fuel for use in the submerged burner units is natural gas because of the economy and facility attending its use. However, while it is predominantly methane, almost all natural gas, and depending on the locale of its source, contains nitrogen in amounts of about 5% to 6% or even up to 10% or higher so that notwithstanding the use of pure oxygen as the oxidizing medium, some nitrogen will be present in the products of combustion. On the other hand, the use of natural gas-pure oxygen in a submerged burner unit produces nitrogen in the products of combustion at levels as low as 3% whereas a natural gas-air mixture produces nitrogen in the products of combustion in excess of 70%.

Turning now to a further detailed description of the invention, and referring to the flow diagram FIG. 1, glass-making ingredients are introduced into the melting zone, i.e., the melting chamber or chambers of a glass furnace with the latter being designed to be fired with submerged burner unit equipment which, in accordance with the present invention, are supplied with a gaseous fuel, e.g., natural gas, and an oxidizing medium. The highly heated, high velocity products of combustion enter the batch at the bottom and pass upwardly therethrough rapidly heating the batch ingredients which in time become molten to form a body of glass. The melted glass then flows to the refining zone of the glass furnace wherein it is fined to remove or liberate "seeds" (predominantly occluded nitrogen) which become entrapped in the glass body during melting. The refined glass can then be flowed from the refining zone to and through the forehearth section of the glass furnace for further refining and conditioning, e.g., coloring the glass in the manner described in the patent application of L. F. Robertson et al., entitled "Coloring Glass" filed concurrently herewith.

The glass furnace 50 shown in FIG. 2 includes one or more melting chambers 3, wherein the batch ingredients are introduced and melted and for which purpose they each are provided with one or more submerged burner units 13. As will be understood, combusting fuel in the melting chambers in the presence of an oxidizing medium low in or devoid of nitrogen produces a higher flame temperature because of the reduced presence of inert gas in the combusted mixture, and accordingly, either furnace output can be increased, or for a given output, furnace melting chamber size can be reduced. The glass furnace also includes a refining section 1 into which the molten glass flows from the melting chambers and wherein conditioning of the glass to remove seeds takes place. The refining section 1 is provided with suitable heating means for heating the same to insure proper fining temperatures, such means being a conventional feature on glass furnaces and being shown diagrammatically on each side of the furnace as at 5. The furnace 50 also can be provided with a roof (not shown), an end wall 7, a floor 8, and side walls 31 through which the heating means 5 extend.

Each of the melting chambers 3 is provided with suitable side wall structure, a roof, a discharge spout 11 extending through chamber opening 9 to communication with the refining secton 1, and a suitable inlet at the top of the melting chamber through which are introduced the glass-making batch ingredients. As will be noted, the melting chambers 3 can be fired with one or more submerged burner units 13 which extend through the bottom of the glass furnace, the burner units being provided with suitable manifold connections for delivering gaseous fuel and oxidizing medium thereto. The oxidizing medium should as indicated earlier have a nitrogen content below the nitrogen content of air, more preferably substantially below that of air, but most preferably substantially devoid of nitrogen. After a suitable period of exposure to the high velocity, highly heated products of combustion issuing from the submerged burner units 13, the batch becomes molten and outflows from the melting chambers to the refining section. In accordance with the present invention, the fining operation occurring in the refining section can be carried out at lower temperatures than are commonly required when the submerged burner units in the melting chambers are fired with a fuel-air mixture. The diminished presence of nitrogen in the burner unit products of combustion means that less nitrogen enters the glass and therefore measurably reduces the fining problems. A glass batch melted in accordance with the present invention can be refined for example, in one-half hour at a fiining temperature of 2200° F.–2300° F., whereas glass melted with submerged burner units using a natural gas-air mixture for firing and refined in the same period of one-half hour requires a fining temperature to be about 2600° F. An important advantage of the use of a lower fining temperature is the reduction of firing effect on the refining section refractory, particularly the Crown refractory.

Upon completion of the fining operation, the melted and refined glass thereafter flows from the furnace refining section 1 through outlet 4 into forehearth 16 where other conditioning of the glass such as coloring can be effected, the forehearth being provided at its forward end with an outlet 19 or other means for the discharge of the glass for ultimate use. Additional forehearths 21 and 22 may be provided in the furnace in the manner shown in FIG. 2.

When submerged burner units supplied with an oxidizing medium low in or devoid of nitrogen, e.g., oxygen, are employed for introducing hot combustion products directly into the glass batch below the surface thereof, the quantity of occluded gases or seeds entrapped in the melt is significantly reduced and in some instances can be reduced by as much as seven times. After fining under normal conditions, glass melted with submerged burner equipment using an oxidizing medium in accordance with the present invention has a higher density than similarly melted glass produced using burners employing air as the oxidizing medium.

Representative soda-lime container glass test samples were melted in a furnace fired with submerged burner units using an oxidizing medium in accordance with the present invention. The seed count, determined by conventional methods, of these samples was compared with the seed count of similar glass standard samples melted in a furnace fired with submerged burner units using air as the oxidizing medium. The results are shown in Table I below.

TABLE I

| Type of burner | Seed count | Seeds/gram |
|---|---|---|
| Air-gas | 252 | 187 |
| Oxygen-gas | 112 | 27 |

The densities, determined by conventional methods, of representative soda-lime container glass test samples melted in a furnace fired with submerged burner units using an oxidizing medium according to the present invention and subjected to standard fining conditions of 2200° F. and 2300° F. for about one hour were compared with those of similar standard glass samples melted in the furnace fired with submerged burner units using air as the oxidizing medium. The results are shown below in Table II.

TABLE II.—FINING TREATMENT

| Burner | Temperature, °F. | Time, hr. | Glass density, gram/cm.³ |
|---|---|---|---|
| Oxygen-gas | 2,200 | 1 | 2.5055 |
| Air-gas | 2,200 | 1 | 2.4824 |
| Oxygen-gas | 2,300 | 1 | 2.5054 |
| Air-gas | 2,300 | 1 | 2.5014 |

These density changes, as will be noted, are significant. A decrease of about 0.01 gr./cm.³ in density is indicative of a level of occluded gases which is unacceptable for most glass applications. As was indicated earlier, the present invention does not exclude using air in the oxidizing medium provided the level of nitrogen it will introduce into the products of combustion does not adversely affect the fining operation or ultimate glass product. Thus, depending on the nature of the particular glass composition and its intended use, as much as 30% of weight of nitrogen in the products of combustion and which enters the melt as small bubbles or seeds could be acceptable. Thus, for example, air can be enriched with pure oxygen in such ratio as will insure that the products of combustion will not contain more than 30% nitrogen by weight. It will be understood that more seeds can be tolerated in containers and bottles than can be tolerated in plate glass. However with respect to plate glass, less than 10% by weight of nitrogen in the products of combustion is preferred.

What is claimed is:

1. In a process for making glass which includes the step of melting glass batch wherein heat is supplied by introducing products of combustion of a gaseous fuel into the glass at a submerged level therein, the improvement which comprises combustion the gaseous fuel in an oxidizing medium having a nitrogen content substantially below the nitrogen content of air.

2. The process according to claim 1 wherein the oxidizing medium is essentially pure oxygen.

3. The process according to claim 1 wherein the oxidizing medium is oxygen enriched air.

4. The process of claim 3 wherein the ratio of pure oxygen to air is such that the products of combustion do not contain more than 30% nitrogen by weight.

5. The process of claim 1 wherein the gaseous fuel is natural gas.

References Cited

UNITED STATES PATENTS

| 2,718,096 | 9/1955 | Henry et al. | 65—335 |
| 3,170,781 | 2/1965 | Keefer | 65—178 |
| 3,248,205 | 4/1966 | Dolf et al. | 65—335 |

ARTHUR D. KELLOGG, Primary Examiner

U.S. Cl. X.R.

65—134

PO-1050
(5/69)

UNITED STATES PATENT OFFICE
CERTIFICATE OF CORRECTION

Patent No. 3,606,825            Dated September 21, 1971

Inventor(s) Andrew L. Johnson

It is certified that error appears in the above-identified patent and that said Letters Patent are hereby corrected as shown below:

Col. 6, line 18.  Change "combustion" to --combusting--

Signed and sealed this 5th day of September 1972.

(SEAL)
Attest:

EDWARD M. FLETCHER, JR.            ROBERT GOTTSCHALK
Attesting Officer                   Commissioner of Patents